United States Patent
Arroyo et al.

(10) Patent No.: US 9,110,729 B2
(45) Date of Patent: Aug. 18, 2015

(54) HOST SYSTEM ADMISSION CONTROL

(75) Inventors: Diana Jeanne Arroyo, Austin, TX (US);
Zohar Feldman, Haifa, IL (US);
Michael Masin, Haifa, IL (US);
Malgorzata Steinder, Leonia, NJ (US);
Asser Nasreldin Tantawi, Somers, NY (US); Ian Nicholas Whalley, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 13/399,298

(22) Filed: Feb. 17, 2012

(65) Prior Publication Data

US 2013/0219066 A1    Aug. 22, 2013

(51) Int. Cl.
G06F 9/50    (2006.01)

(52) U.S. Cl.
CPC ........ G06F 9/5077 (2013.01); *G06F 2209/503* (2013.01); *G06F 2209/504* (2013.01); *Y02B 60/142* (2013.01)

(58) Field of Classification Search
CPC . G06F 9/45533; G06F 9/4881; G06F 9/5077; G06F 2209/504; G06F 2209/503
USPC .............. 709/223, 224, 225, 226; 718/1, 100, 718/103, 104
See application file for complete search history.

(56) References Cited

U.S. PATENT DOCUMENTS

| | | | |
|---|---|---|---|
| 6,463,454 B1* | 10/2002 | Lumelsky et al. | 718/105 |
| 7,337,283 B2 | 2/2008 | Susaki et al. | |
| 7,478,361 B2 | 1/2009 | Peteanu et al. | |
| 7,788,357 B2* | 8/2010 | Riley et al. | 709/223 |
| 7,853,953 B2 | 12/2010 | Devarakonda et al. | |
| 7,900,206 B1* | 3/2011 | Joshi et al. | 718/104 |
| 7,966,169 B2 | 6/2011 | Vega | |
| 8,010,679 B2* | 8/2011 | Low et al. | 709/227 |
| 8,019,766 B2* | 9/2011 | Chan et al. | 707/740 |
| 8,370,496 B1* | 2/2013 | Marr | 709/226 |
| 8,510,590 B2* | 8/2013 | Ji et al. | 714/3 |
| 8,667,500 B1* | 3/2014 | Ji et al. | 718/105 |
| 8,671,407 B2* | 3/2014 | Ballani et al. | 718/1 |

(Continued)

OTHER PUBLICATIONS

Georgoulas, Stylianos, Panos Trimintzios, and George Pavlou. "Admission control placement in differentiated services networks." In Computers and Communications, 2004. Proceedings. ISCC 2004. Ninth International Symposium on, vol. 2, pp. 816-821. IEEE, 2004.*

(Continued)

*Primary Examiner* — Jimmy H Tran
(74) *Attorney, Agent, or Firm* — Ference & Associates LLC (57) ABSTRACT

Systems and methods for admission control to a physical host system are provided herein. One aspect provides for receiving at least one resource request at an admission control component of a distributed computing system, the at least one resource request comprised of at least one system type; processing the at least one resource request utilizing at least one physical host accessible to the distributed computing system; specifying a number of resource request slots to be reserved for at least one system type based on at least one future reservation threshold accessible to the admission control component; and blocking resource requests from entering the system through the admission control component based on a number of available resource request slots and the at least one future reservation threshold. Other embodiments and aspects are also described herein.

21 Claims, 7 Drawing Sheets

(56) References Cited

U.S. PATENT DOCUMENTS

| | | | |
|---|---|---|---|
| 8,768,875 B2* | 7/2014 | Xiong et al. | 706/52 |
| 8,843,933 B1* | 9/2014 | Holler et al. | 718/104 |
| 8,910,153 B2* | 12/2014 | Gupta et al. | 718/1 |
| 8,984,508 B2* | 3/2015 | Shu et al. | 718/1 |
| 2004/0082363 A1* | 4/2004 | Hosein | 455/560 |
| 2004/0111506 A1* | 6/2004 | Kundu et al. | 709/223 |
| 2005/0228892 A1* | 10/2005 | Riley et al. | 709/228 |
| 2007/0043860 A1 | 2/2007 | Pabari | |
| 2007/0180448 A1* | 8/2007 | Low et al. | 718/1 |
| 2007/0260723 A1* | 11/2007 | Cohen et al. | 709/223 |
| 2007/0271560 A1 | 11/2007 | Wahlert et al. | |
| 2008/0043623 A1* | 2/2008 | Franceschini et al. | 370/235 |
| 2008/0155537 A1* | 6/2008 | Dinda et al. | 718/1 |
| 2008/0189700 A1* | 8/2008 | Schmidt et al. | 718/1 |
| 2008/0256607 A1* | 10/2008 | Janedittakarn et al. | 726/4 |
| 2008/0271039 A1* | 10/2008 | Rolia et al. | 718/105 |
| 2009/0158275 A1 | 6/2009 | Wang et al. | |
| 2010/0030896 A1* | 2/2010 | Chandramouli et al. | 709/224 |
| 2010/0205302 A1* | 8/2010 | Rechterman | 709/226 |
| 2010/0257263 A1* | 10/2010 | Casado et al. | 709/223 |
| 2010/0281478 A1* | 11/2010 | Sauls et al. | 718/1 |
| 2011/0010721 A1* | 1/2011 | Gupta et al. | 718/103 |
| 2011/0035494 A1* | 2/2011 | Pandey et al. | 709/224 |
| 2011/0099267 A1* | 4/2011 | Suri et al. | 709/224 |
| 2011/0119381 A1* | 5/2011 | Glover et al. | 709/226 |
| 2011/0252135 A1* | 10/2011 | Kudo | 709/224 |
| 2011/0296052 A1* | 12/2011 | Guo et al. | 709/240 |
| 2012/0054349 A1* | 3/2012 | Chandrasekaran et al. | 709/227 |
| 2012/0054763 A1* | 3/2012 | Srinivasan | 718/104 |
| 2012/0102190 A1* | 4/2012 | Durham et al. | 709/224 |
| 2012/0109873 A1* | 5/2012 | Xiong et al. | 706/52 |
| 2012/0159476 A1* | 6/2012 | Ramteke et al. | 718/1 |
| 2012/0179446 A1* | 7/2012 | Tylutki | 703/21 |
| 2012/0233333 A1* | 9/2012 | Ganesan et al. | 709/227 |
| 2012/0284408 A1* | 11/2012 | Dutta et al. | 709/226 |
| 2012/0331124 A1* | 12/2012 | Venkatesh et al. | 709/224 |
| 2013/0007272 A1* | 1/2013 | Breitgand et al. | 709/224 |
| 2013/0014101 A1* | 1/2013 | Ballani et al. | 718/1 |
| 2013/0031035 A1* | 1/2013 | Jeanne et al. | 706/12 |
| 2014/0157274 A1* | 6/2014 | Ballani et al. | 718/1 |

OTHER PUBLICATIONS

Urgaonkar, B., et al., "Cataclysm: Scalable overload policing for internet applications, Journal of Network and Computer Applications", 2008, 31 pages, V31, N4, Elsevier B.V., Netherlands, Preliminary version of paper appeared in the Proceedings of the Proceedings of the 14th International World Wide Web Conference (WWW 2005), May 2005, Chiba, Japan.

Mahabhashyam, S. R., et al., "Dynamic resource allocation of shared data centers supporting multiclass requests, Proceedings of the First International Conference on Automomic Computing", 2004, New York, New York, USA.

Lee, Y. C., et al., "On the Effect of Using Third-Party Clouds for Maximizing Profit", Proceedings of Algorithms and Architectures for Parallel Processing, 10th International Conference ICA3PP 2010, May 21-23, 2010, pp. 381-390, Springer-Verlag Berlin Heidelberg.

* cited by examiner

HOST SYSTEM ADMISSION CONTROL

FIELD OF THE INVENTION

The subject matter presented herein generally relates to deploying resources in a distributed computing environment.

BACKGROUND

Modern large data centers are structured to operate in a distributed operating environment, such as a cloud computing environment. This environment allows for dynamic access to a shared architecture of computing resources that can be rapidly deployed to handle user requests, such as cloud-based storage requests, vault services, data processing, and information retrieval. The efficiency of data centers may be enhanced through virtualization, wherein the physical computing resources (e.g., servers, processors, etc.) that actually handle requests are abstracted as one or more virtual entities. A prominent virtual entity is a virtual machine (VM), which is essentially a self-contained operating system comprising a software implementation of a processor.

In general, each VM may be configured to operate within its own partition on a data center physical host (i.e., server) essentially as its own independent computer. The physical hosts process and handle requests from the virtual machines. Efficient mapping of VMs to physical hosts requires knowing the resource requirements of the VMs and the capacity of the physical hosts.

BRIEF SUMMARY

One aspect provides a system comprising: an admission control component configured to receive at least one resource request, the at least one resource request comprised of at least one system type; at least one physical host configured to process the at least one resource request; and at least one future reservation threshold accessible to the admission control component, the future reservation threshold configured to specify a number of resource request slots to be reserved for at least one system type; wherein the admission control component blocks resource requests from entering the system based on a number of available resource request slots and the at least one future reservation threshold.

Another aspect provides a method comprising: receiving at least one resource request at an admission control component of a distributed computing system, the at least one resource request comprised of at least one system type; processing the at least one resource request utilizing at least one physical host accessible to the distributed computing system; specifying a number of resource request slots to be reserved for at least one system type based on at least one future reservation threshold accessible to the admission control component; and blocking resource requests from entering the system through the admission control component based on a number of available resource request slots and the at least one future reservation threshold.

A further aspect provides a computer program product comprising: a computer readable storage medium having computer readable program code embodied therewith, the computer readable program code comprising: computer readable program code configured to receive at least one resource request at an admission control component of a distributed computing system, the at least one resource request comprised of at least one system type; computer readable program code configured to process the at least one resource request utilizing at least one physical host accessible to the distributed computing system; computer readable program code configured to specify a number of resource request slots to be reserved for at least one system type based on at least one future reservation threshold accessible to the admission control component; and computer readable program code configured to block resource requests from entering the system through the admission control component based on a number of available resource request slots and the at least one future reservation threshold.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Modern large datacenters that automate online deployment of systems with variable resource requirements, lifetime, and revenue margins face possible loss of revenue when utilization rates are high. However, in clouds that serve virtual machine (VM) resource requests of different sizes, online placement may lead to disproportionately high blocking of VMs with the largest resource requirements. This may negatively impact revenue as the largest VMs tend to have the highest price per unit of allocated resource.

As the utilization of a datacenter approaches its capacity, deployments are likely to fail due to fragmentation in the datacenter. Although existing intelligent placement technology may attempt to minimize fragmentation, solutions that rely on such placement technology still suffer significant revenue degradation. In addition, deployments may have variable value characteristics, such as price per unit of allocated resource and other measures associated with data center revenue margins. Therefore, a system that takes such variable value characteristics into account may offer improved overall revenue than one that does not. For example, it may be preferable to fail a deployment with lower revenue margin even though enough capacity is available in order to leave capacity for future deployments with larger margins.

According to existing technology, primary methods for preferential deployments include utilizing priority settings, static reservations of resources, or pre-computation of the optimal deployment solution. The priority setting method does not adequately solve the capacity problem since no knowledge of future preferred deployments exists at the time decisions are made to allow a deployment that may eventually block a preferred (e.g., higher revenue) deployment. Static reservation methods pre-determine resource capacities and set aside for potential deployments of preferred systems. However, in the event that preferred deployments arrive at a lowered frequency, revenue loss is likely to occur when arrivals of less preferred deployments exceed the unreserved capacity and must be dropped. Pre-computing the optimal solution requires all knowledge of arrival rates and lifetimes. As such, this technique is not feasible in an online environment where arrival rates and lifetimes are not known in advance.

Accordingly, embodiments provide for reserving capacity for future data center deployments according to a Future Reservations system that operates to maximize resource utilization and data center revenue. Deployments of resource requests may be categorized according to certain characteristics, including, but not limited to, resource requirements, processing time, application type, source, and revenue. Example embodiments include setting a threshold for open deployment slots of preferred deployments to trigger the blocking of some less preferred deployments. A Future Reservations system configured according to embodiments may activate the blocking of certain deployments when utilization at a data center is above a predetermined threshold and may de-activate the blocking of certain deployments when utilization is below said threshold. This arrangement may allow the available capacity to be used for all deployment types when capacity is not an issue, allowing a datacenter to maximize profit with deployments of both high and low revenue margins when resource pressures are low.

When a threshold is triggered, Future Reservations may allow for deployments of different resource requirements and revenue margins while at the same time reserving capacity for future preferred deployments. In addition, capacity reservation may be utilized for future preferred deployment capacity, while static reservation may include capacity that is both in use by current deployments and available for future deployments.

Figure 1:
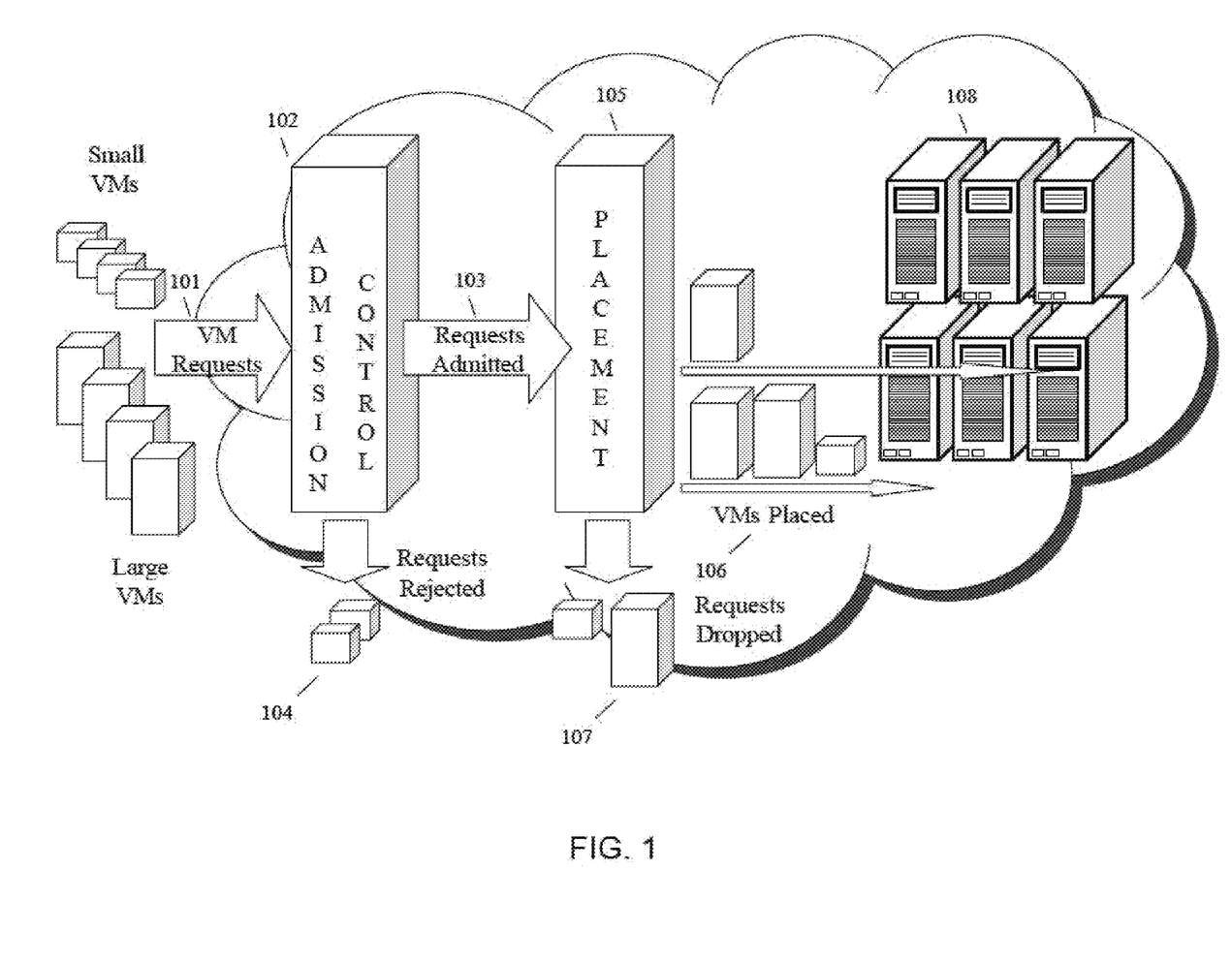
FIG. 1 provides an example data center distributed computing environment.

Referring to FIG. 1, therein is provided an example data center distributed computing environment. VM requests 101 are communicated to an admission control 102 element, wherein certain requests are admitted 103 and certain other requests are rejected 104. Admitted requests 103 may move to a placement component 105 configured to place requests 106 on physical hosts 108 configured to process resource requests, such as VM requests. However, not all requests are placed on the physical hosts 106 and are dropped 107, for example, because there is not enough capacity to handle the request.

Figure 2:
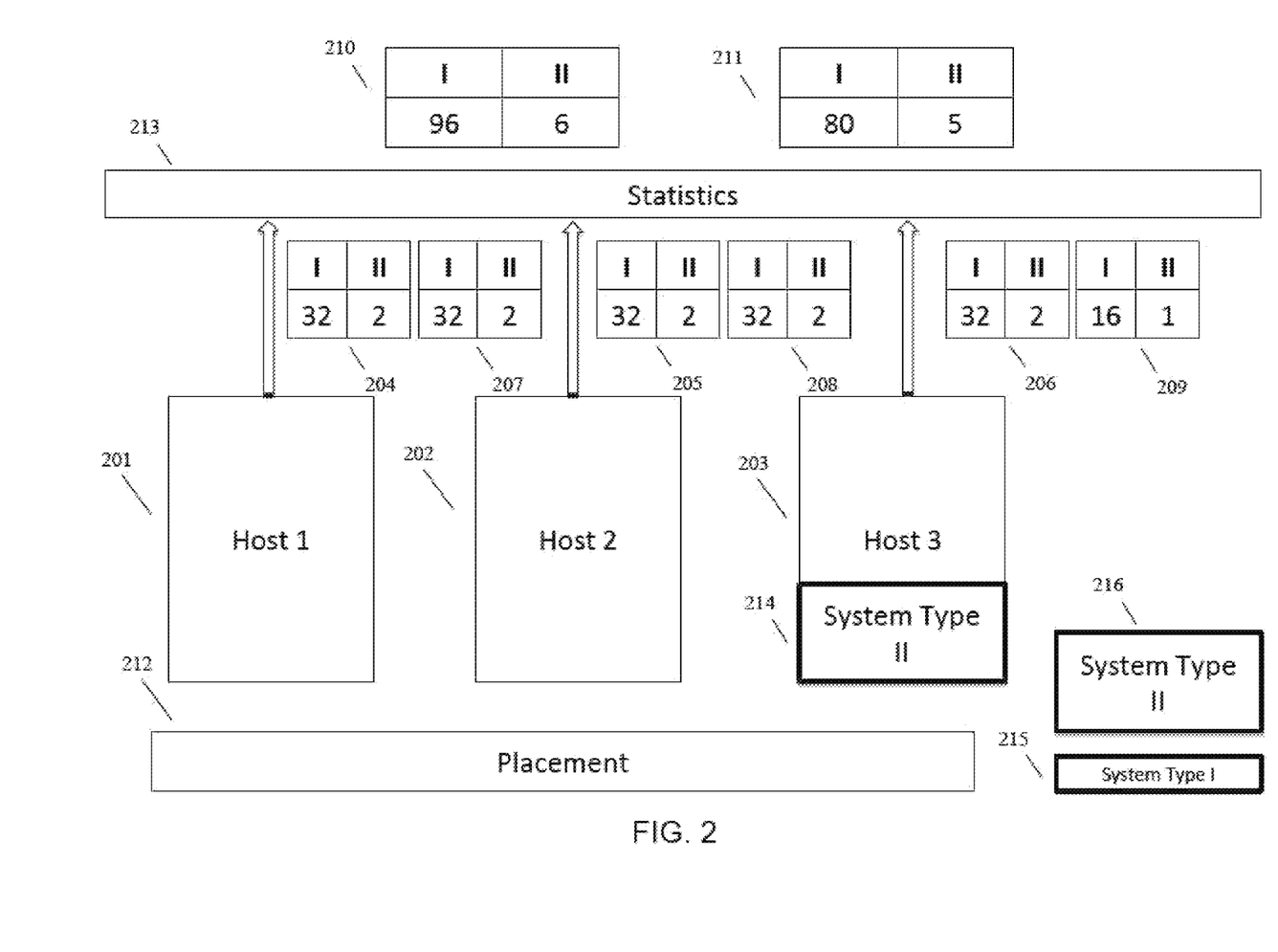
FIG. 2 provides an example data center configured according to an embodiment.

Referring to FIG. 2, therein is provided an example data center configured according to an embodiment. The example data center illustrated in FIG. 2 operates with two types of deployable systems, system type I 215 systems and system type II 216 systems and is comprised of three physical hosts 201-203 each associated with a resource capacity 204-209. As described herein, embodiments provide that the deployable systems may be in the form of VMs; however, embodiments are not so limited, as any resource request capable of being managed according to embodiments is contemplated herein.

The physical hosts depicted in FIG. 2 are considered 'homogeneous' because they each have the same resource capacity or 'slots' for each deployable system type. The initial resource capacity 204-206 for each physical host 201-203 demonstrates that each host has a maximum of 32 slots for system type I 210 VMs or a maximum of 2 slots for system type II 211 VMs. As is typical for a data center, the slots for the different types of systems are not independent of each other. For example, in the example data center of FIG. 2, deployment of a system type II 211 VMs may consume 1 system type II slot, but the number of available system type I slots may drop by 16.

As deployment requests of the two types of deployable systems 215, 216 arrive, the placement component 212 may handle these requests and determine which physical host 201-203 may receive the newly deployed system type 215, 216. The placement component 212 may be responsible for efficiently placing all deployable systems in the data center and may consider all physical hosts 201-203 as possible candidates for placement. In addition, the placement component 212 may be responsible for blocking some system types 215, 216 from being deployed to one or more physical hosts 201-203 when requested.

An admission control component (not shown), described in detail below, may be configured according to embodiments to send requests to the placement component 212 to begin blocking deployment of certain system types. As such, the admission control component may guard against the blocking of more valuable VMs by fragmentation, that is, where less valuable VMs may be spread across physical hosts, making it impossible to deploy the more valuable VMs. According to embodiments, the admission control component may interact with the placement component 212, for example, by communicating to the placement component 212 those hosts not currently eligible to host particular VM types or to obtain additional information concerning the hosting environment.

The overall deployment capacity of each system type 215, 216 may be tracked utilizing a statistics 213 component. As shown in FIG. 2, the initial data system capacity 210 provides there are 96 available system type I 215 slots and 6 system type II 216 slots. As systems begin to be deployed, the overall available deployment capacity for the data center 211 and each individual host 207-209 for each type of system may be reduced for both system types. For example, if a single system type II 214 has been placed on host 3 203, then the overall number of available system type II slots is reduced from 6 to 5 and the number of available system type I slots is reduced from 96 to 80, as shown by the overall available deployment 211 statistics.

In the example datacenter provided in FIG. 2, the number of future deployment slots for each type of system in the overall datacenter may be monitored. For example, embodiments provide that a preferred system type may be identified based on one or more system type characteristics, including, but not limited to, revenue margins. According to embodiments, the number of future deployment slots may be monitored to ensure that the number of available slots for a particular preferred system type does not go below a Future Reservation threshold for the preferred system type. Embodiments provide for an admission control component that may be responsible for monitoring current data center usage and triggering the Future Reservation mode, for example, when the number of available deployment slots goes below a certain threshold.

Figure 3:
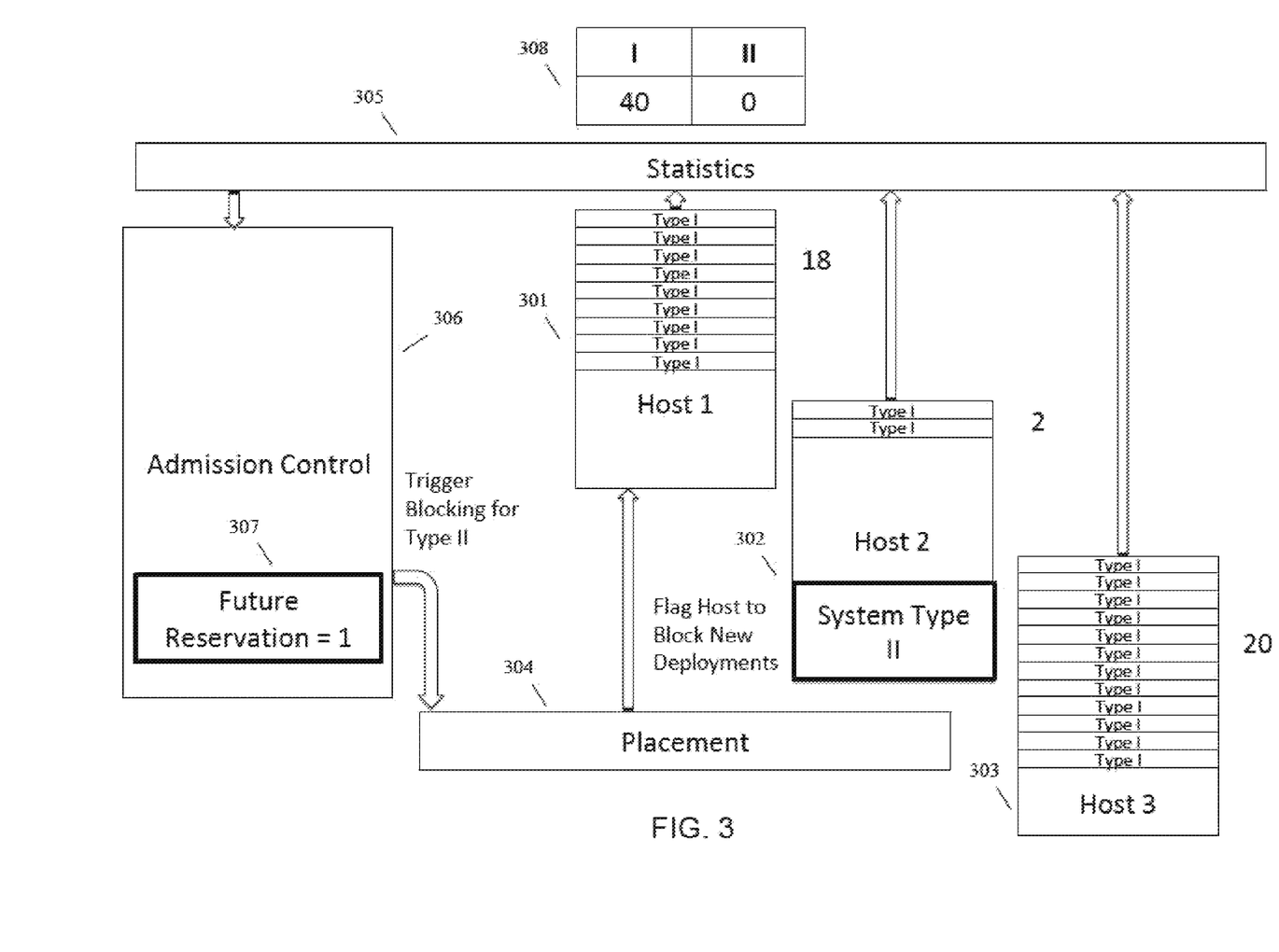
FIG. 3 provides an example data center configured to utilize Future Reservations according to an embodiment.

FIG. 3 provides an example data center configured to utilize Future Reservations according to an embodiment. The data center of FIG. 3 is comprised of three physical hosts 301-303, a placement component 304, a statistics component 305, and an admission control component 306. In this example data center, system type II deployments are preferred over system type I deployments. Thus, a Future Reservation threshold 307 for system type II deployments has been set to 1. Accordingly, the data center depicted in FIG. 3 may be configured to maintain 1 available slot for system type II deployments. If the number of system type II Future Reservations drops below the threshold, the system may trigger a Future Reservation blocking mode. According to an embodiment, this blocking mode may initiate the blocking of the placement of system type I deployments on a subset of targeted hosts in order to allow those targeted hosts to free up capacity over time. For example, capacity may be increased when these targeted hosts free up resources as current running systems complete and depart over time.

In the datacenter depicted in FIG. 3, a number of systems have been deployed such that the datacenter is currently hosting 40 system type I systems (18 on host 1 301, 2 on host 2 302, and 20 on host 3 303) and 1 system type II system (on host 2 302), as determined by the statistics component 305. As such, there are 40 system type I slots available and no system type II slots available. According to embodiments, the admission control component 306 may operate to get the system back to a state where the number of available system type II slots is equal to the Future Reservations threshold 307, which is set at 1.

The admission control component 306 may identify that the number of available system type II slots has fallen below the Future Reservations threshold. The admission control component 306 may then communicate a request to the placement component 304 to start blocking the placement of system type I requests on one or more physical hosts 101-103, therefore, establishing a preference for the placement of system type II on those particular hosts.

According to a certain embodiment, the particular hosts chosen for blocking by the placement component 304 may be a host that has the highest probability of freeing up enough space for a system type II VM to be deployed in the future. This probability may consider, inter alia, system lifetime and the number of system instances on each physical host 301-303. Embodiments provide for a variety of different approaches for selecting blocking hosts. A non-limiting example provides that the admission control component 306 and placement component 304 may coordinate to block deployments to multiple hosts in order to increase the probability of getting a system type II slot. According to embodiments, the admission control 306 and placement component 304 may determined the relative preference of the types, the lifetimes of the systems, capacity of the hosts, a severity of the threshold violation, combinations thereof, and by utilizing any other characteristics that may operate to maximize data center resource utilization and revenue.

In the example shown in FIG. 3, a single physical host, host 1 301, has been selected to block future system type I VM deployment. According to an embodiment, the selection of host 1 301 by the placement component 304 may be based on the situation wherein host 1 301 was the physical host closest to having enough space for an available system type II slot. Accordingly, no new system type I VMs may deploy to host 1 301, but can still be deployed to host 2 302 and host 3 303. As such, if requests for more system type I deployments occur, they may still be process but cannot cause additional fragmentation on host 1 301.

Embodiments provide for one or more blocking flags configured to specify which hosts are blocked from receiving certain types of resource requests. According to embodiments, the blocking flag may be dynamically assigned based on the capacity of the data center, VM type preferences, Future Reservation thresholds, or some combination thereof. As such, when host 1 301 has been selected as the blocking host, a blocking flag may be set designating this host as blocking certain system requests (e.g., non-preferred system requests such as system type I VMs).

Figure 4:
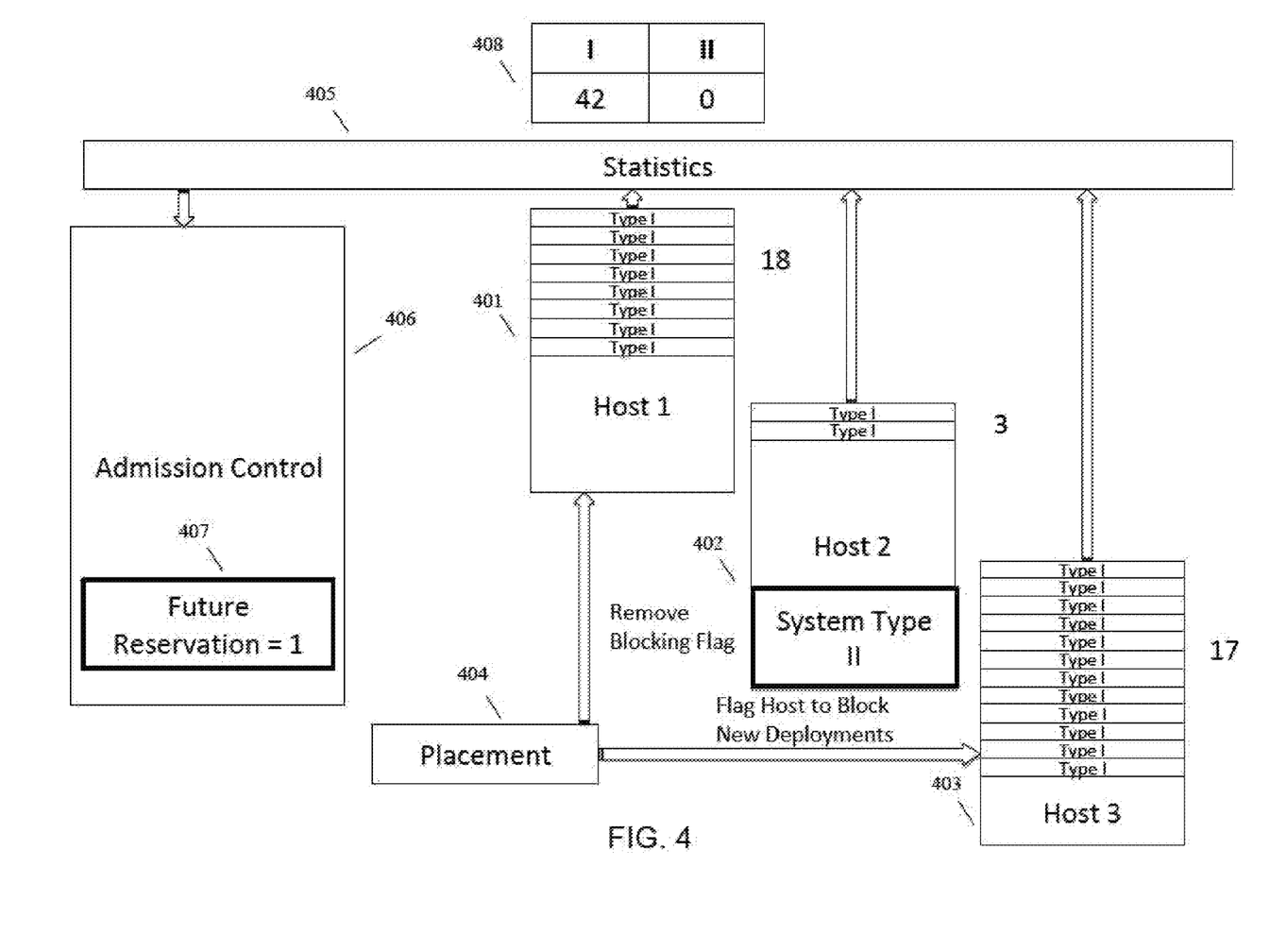
FIG. 4 provides an example data center utilizing a dynamic blocking flag according to an embodiment.

Referring to FIG. 4, therein is provided an example data center utilizing a dynamic blocking flag according to an embodiment. According to embodiments, the selection of hosts to block certain VM deployments may change before the Future Reservation slot is obtained. For example, certain host capacities may change, affecting the selection of a blocking host. The example data center in FIG. 4 is in the same state as that depicted in FIG. 3, except for the following changes: 1) a new system type I VM has been deployed in the datacenter on host 2 402 and 2) three system type I VMs have departed the datacenter from host 3 403. As such, the datacenter depicted in FIG. 4, is currently hosting 42 system type I systems (18 on host 1 401, 3 on host 2 402, and 17 on host 3 403) and 1 system type II systems (on host 2 402), as determined by the statistics component 405. As such, there are 42 system type I slots available and no system type II slots available, as indicated by the statistics display 408. The admission control component 406 along with the placement component may operate to get the system back to a state where the number of available system type II slots is equal to the Future Reservations threshold 407, which, in this example, is set at 1.

In view of the change of VM types in the data center, the placement component 404 has now identified that host 3 403, and not host 1 401, has a higher probability of freeing up enough space for a system type II slot. As such, the target host for the Future Reservation slot is accordingly changed to host 3 403. In this state, no new system type I VMs may deploy to host 3 401, but new system type I VMs may now deploy to host 1 401.

Once capacity is freed up in order to create a slot for the one or more preferred types of VMs, the Future Reservation blocking mode may be removed from all hosts. The Future Reservation threshold may be specified, for example, to maximize revenue for a datacenter or for specifying data center service level goals (e.g., drop rates, fair accept/reject ratios). As an illustrative and non-limiting example, the Future Reservation threshold may be affected by the number of different VM types, arrival mix of VM types, revenue associated with each VM type, the architecture of the particular data center, importance of VM request generator, or combinations thereof.

Although examples have been provided herein comprised of two system types and one Future Reservation threshold, embodiments are not so limited, as the Future Reservation system may be applied to multiple system types and may utilize multiple thresholds to manage each type. According to an embodiment, Future Reservation systems for datacenters with more than two deployable system types may employ a policy for Future Reservations for each preferred type implemented in the admission control element. In a non-limited example, if a datacenter has three deployable types (Type I, Type II, and Type III), and each type increases in revenue respectively where Type III is the highest revenue generator, Future Reservation thresholds may be specified for multiple system types. In the non-limiting example, the admission control component may be configured with one or more Future Reservation thresholds to specify a preferred system type ordering (e.g., I, II, III; III, II, I; II, I, III, etc.). In addition, the most efficient and/or profitable Future Reservation threshold values may be determined through one or more simulations according to one or more factors, such as maximizing revenue or achieving a minimum drop rate for a particular VM type.

Systems, processes, and methods for managing resource request deployments in a data center in a manner that minimizes fragmentation by setting a threshold for open deployment slots that favors the deployment of preferred (i.e., more valuable) resource requests over less preferred (i.e., less valuable) resource are provided herein. Embodiments provide for admission control in a hosting environment for certain typed entities, for example, typed entities comprised of VMs of a limited number of different types. Admission control may consist of a monitoring system configured to determine the admission capacity for each typed entity. According to embodiments, admission capacity may be obtained by determining how many new instances of each typed entity may be admitted at any time without exceeding the specified capacity of the environment. In addition, admission control may utilize a variable number of Future Reservation thresholds for each different type of entity.

An admission control component arranged according to embodiments may respond to specified Future Reservation thresholds and the current admission capacity for each typed entity alone or in combination with other information, and may determine whether or not each entity submitted for deployment may be admitted without triggering the blocking of some system types on some hosts. The admission control component may compare the current admission capacity for all entity types with their Future Reservation thresholds and, in the event that a submitted entity may be admitted without reducing the admission capacity for any entity type with a higher priority, the submitted entity may be admitted without triggering the blocking of some system types on some hosts.

As previously described, Future Reservation thresholds may be static or dynamic. For example, Future Reservation thresholds and system type priorities may be updated periodically based on data center capacity and other relevant conditions, such as changes in the submission rates of VM types. An illustrative and non-restrictive example provides that the Future Reservation thresholds and system type priorities may be updated by one or more online components and communicated to the hosting system, which may update itself to the newly submitted values.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 5:
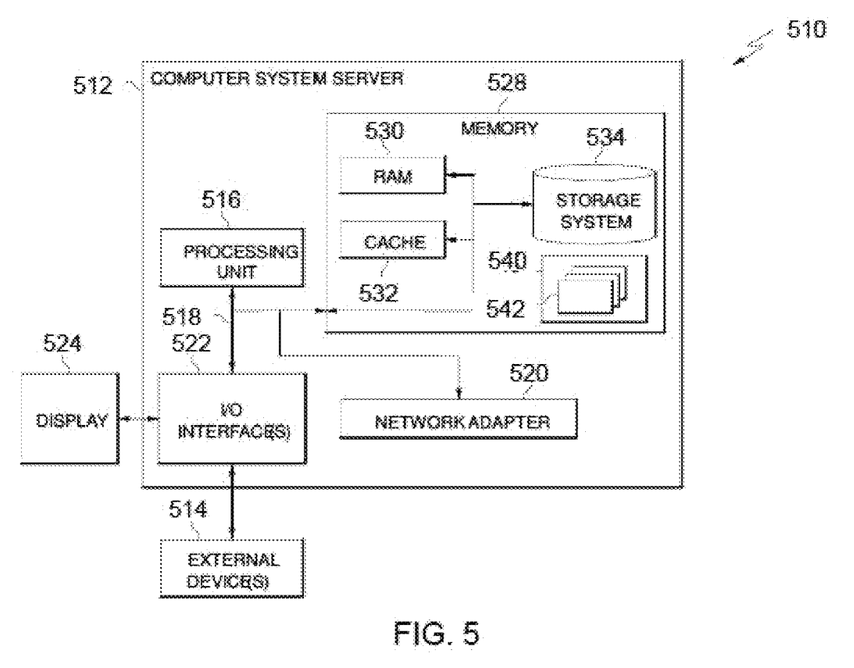
FIG. 5 illustrates an example circuitry of a computer system.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
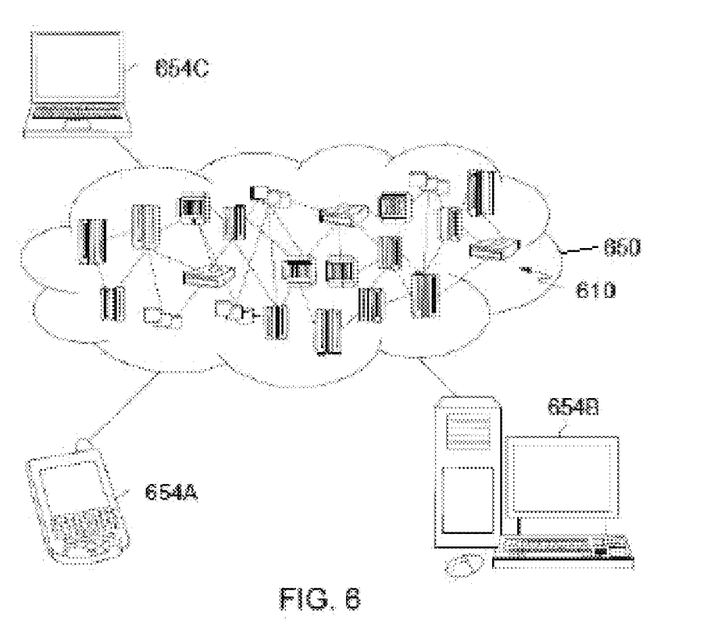
FIG. 6 illustrates an example cloud computing environment.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-C shown in FIG. 6 are intended to be illustrative only and that computing nodes 610 and cloud computing environment 650 can communicate with any type of computerized device over any type of network and/or network addressable connection (e.g., using a web browser).

Figure 7:
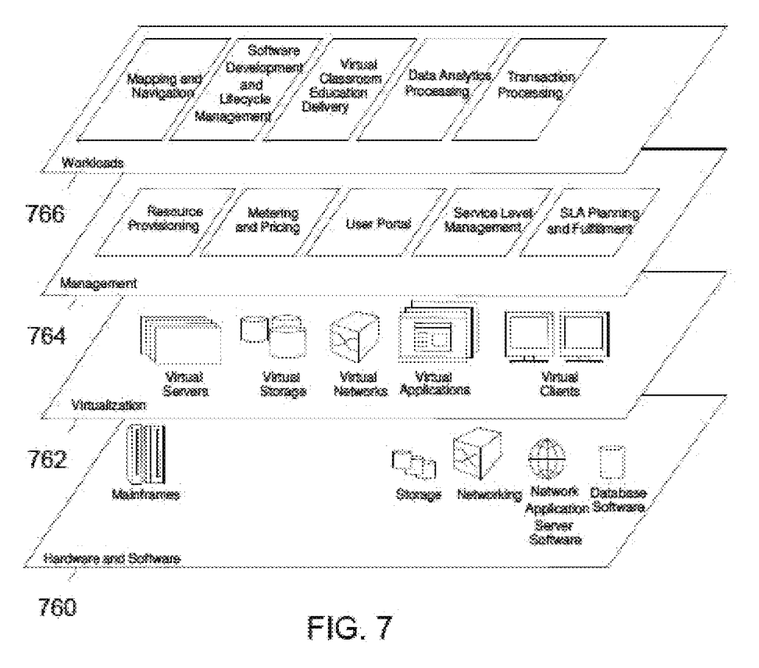
FIG. 7 illustrates another example cloud computing environment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; virtual clients; and virtual machines.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and admission control of submitted requests, including, but not limited to virtual machines.

Those skilled in the art will recognize that aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
   at least one processor in a distributed computer environment comprising:
   an admission control component configured to receive at least one virtual machine resource request, the at least one resource request corresponding to at least one system type;
   the at least one system type comprising a virtual machine type and at least one future reservation threshold corresponding to a number of resource request slots to be reserved for the virtual machine type; and
   at least one physical host configured to process the at least one resource request, relative to an available number of slots;
   the at least one physical host comprising a data center being configured to process virtual machine resource requests of different sizes;
   wherein the admission control component blocks resource requests from entering the system based on a number of available resource request slots and the at least one future reservation threshold.

2. The system according to claim 1, further comprising a statistics component configured to monitor an admission capacity of the at least one physical host.

3. The system according to claim 1, further comprising a flag configured to specify at least one physical host blocked from processing at least one system type.

4. The system according to claim 3, further comprising a placement component configured to place the at least one resource request on the at least one physical host based on the flag.

5. The system according to claim 3, wherein the flag is set based on a probability that the at least one physical host blocked from processing at least one system type will have capacity to process a resource request.

6. The system according to claim 1, wherein the at least one future reservation threshold applies to a preferred system type.

7. The system according to claim 6, wherein the preferred system type is preferred based on system type revenue.

8. The system according to claim 6, wherein the preferred system type is preferred based on a system service level.

9. A method comprising:
   receiving at least one virtual machine resource request at an admission control component of a distributed computing system, the at least one resource request corresponding to at least one system type;
   the at least one system type comprising a virtual machine type;
   the at least one system type comprising a virtual machine type and at least one future reservation threshold corresponding to a number of resource request slots to be reserved for the virtual machine type;
   processing the at least one resource request utilizing at least one physical host accessible to the distributed computing system, relative to an available number of slots;
   the at least one physical host comprising a data center configured to process virtual machine resource requests of different sizes;
   specifying a number of resource request slots to be reserved for at least one system type based on at least one future reservation threshold accessible to the admission control component; and
   blocking resource requests from entering the system through the admission control component based on a number of available resource request slots and the at least one future reservation threshold.

10. The method according to claim 9, further comprising monitoring an admission capacity of the at least one physical host via a statistics component.

11. The method according to claim 9, further comprising specifying at least one physical host blocked from processing at least one system type via a flag.

12. The method according to claim 11, further comprising placing the at least one resource request on the at least one physical host via a placement component based on the flag.

13. The method according to claim 11, wherein the flag is set based on a probability that the at least one physical host blocked from processing at least one system type will have capacity to process a resource request.

14. The method according to claim 9, wherein the at least one future reservation threshold applies to a preferred system type.

15. The method according to claim 14, wherein the preferred system type is preferred based on system type revenue.

16. The method according to claim 14, wherein the preferred system type is preferred based on a system service level.

17. A computer program product comprising:
a non-transitory computer readable storage medium having computer readable program code embodied therewith, the computer readable program code comprising:
computer readable program code configured to receive at least one virtual machine resource request, the at least one resource request corresponding to at least one system type;
the at least one system type comprising a virtual machine type and at least one future reservation threshold corresponding to a number of resource request slots to be reserved for the virtual machine type; and
computer readable program code configured to process the at least one resource request utilizing at least one physical host accessible to the distributed computing system;
the at least one physical host comprising a data center configured to process virtual machine resource requests of different sizes; and
computer readable program code configured to block resource requests from entering the system through the admission control component based on a number of available resource request slots and the at least one future reservation threshold.

18. The computer program product according to claim 17, further comprising computer readable program code configured to monitor an admission capacity of the at least one physical host via a statistics component.

19. The computer program product according to claim 17, further comprising computer readable program code configured to specify at least one physical host blocked from processing at least one system type via a flag.

20. The computer program product according to claim 19, further comprising computer readable program code configured to place the at least one resource request on the at least one physical host via a placement component based on the flag.

21. The computer program product according to claim 19, wherein the flag is set based on a probability that the at least one physical host blocked from processing at least one system type will have capacity to process a resource request.

* * * * *